W. A. FREDERICK.
MULTIPLE FEED GEAR PUMP.
APPLICATION FILED APR. 29, 1910.
974,783.
Patented Nov. 8, 1910.
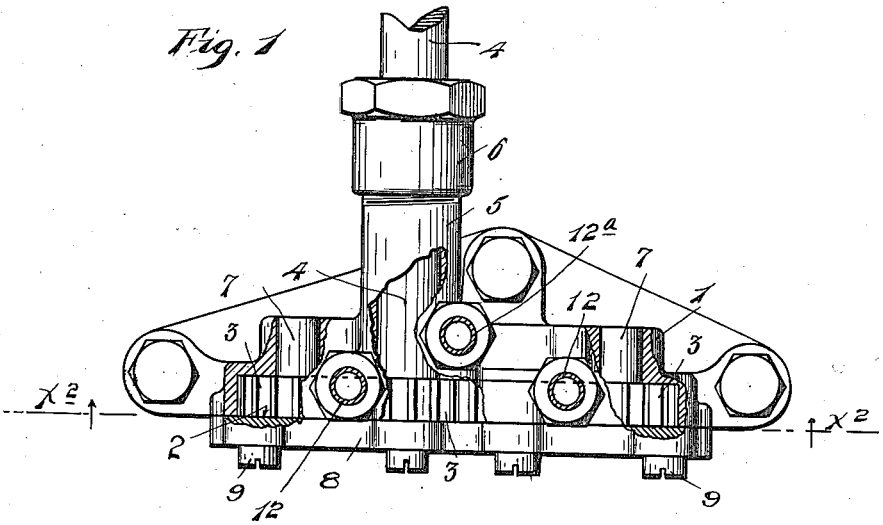
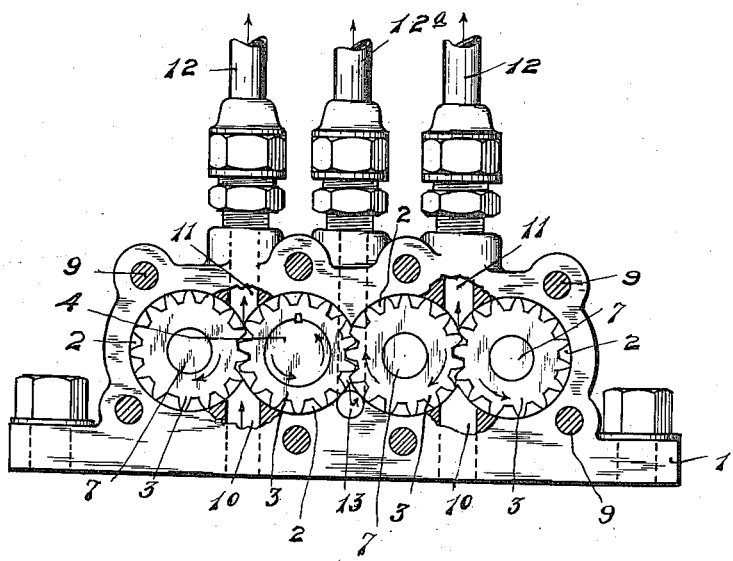
Witnesses
Inventor
Walter A. Frederick.
By his Attorneys.

UNITED STATES PATENT OFFICE.

WALTER A. FREDERICK, OF MUSKEGON, MICHIGAN.

MULTIPLE-FEED GEAR-PUMP.

974,783.

Specification of Letters Patent. Patented Nov. 8, 1910.

Application filed April 29, 1910. Serial No. 558,391.

*To all whom it may concern:*

Be it known that I, WALTER A. FREDERICK, a citizen of the United States, residing at Muskegon, in the county of Muskegon and State of Michigan, have invented certain new and useful Improvements in Multiple-Feed Gear-Pumps; and I do hereby declare the following to be a full, clear, and exact description of the invention, such as will enable others skilled in the art to which it appertains to make and use the same.

My invention has for its object to provide a simplified and improved multiple feed gear pump especially adapted for use in feeding lubricating oil to the bearings of an engine, machine or coöperating plate.

To the above ends, the invention consists of the novel devices and combination of devices hereinafter described and defined in the claims.

In the accompanying drawings which illustrate the invention, like characters indicate like parts throughout the several views.

Referring to the drawings, Figure 1 is a plan view, with some parts broken away, showing the improved multiple feed gear pump; and Fig. 2 is a vertical section taken approximately on the line $x^2$ $x^2$ of Fig. 1, some parts being broken away.

The numeral 1 indicates a casting or body member provided, as shown, with a flat vertical face and formed adjacent to said face with a multiplicity of intersecting gear seats
2. As shown, there are four of these gear seats, but the number thereof may be increased at will. Working in the seats 2, with their teeth closely engaging the same, are gears 3 that intermesh and form a train.
One of the said gears 3 is keyed or otherwise rigidly secured to the inner end of a driving shaft 4 that is journaled in a long sleeve-like hub 5 of the casting 1 and also works through a stuffing box 6 on the end of the said hub.
The other gears 3 are loosely journaled on studs 7 that project axially into the seats 2 from the back of the said casting 1. All of the seats 2 are normally closed by a plate 8 secured to the casting 1, by screws 9, and closely engaging the adjacent faces of the gears 3. The casting 1 is provided with oil admission ports 10 that are connected to a suitable source of oil supply, not shown, and open into the lower intersections of the outer seats 2 and the respective inner seats 2. The casting 1 is also formed with corresponding discharge ports 11 that are connected to oil distributing pipes 12. The four gears constitute three independently operative gear pumps, to-wit, the intermeshing teeth of the outer and corresponding inner gears 3 afford two pumps which discharge oil independently through the pipes 12, and the intermeshing teeth of the two inner gears constitute the third pump which, because of the reverse direction of movement of the intermeshing teeth, is arranged to discharge oil through a lower port 13 that extends laterally in the casting 1 and thence upward to a third oil distributing pipe $12^a$.

The oil for the three pumps is drawn in through the two ports 10 and part thereof is discharged through the ports 11 by the teeth of the outer gears, while a part of the oil is discharged, by the teeth of the two inner gears, through the port 13 and thence through the distributing pipe $12^a$.

It will thus be seen that the oil is positively and independently fed through the several oil delivery pipes, at a speed depending on the speed of the gears and which is proportional to the speed of the gears. It will also be noted that the very same gears which produce the pumping action serve to transmit the motion from the one driving shaft to all the gears. This, as is evident, gives a very simple construction and one in which all of the gears of the pump are arranged to run in oil which is, of course, a highly desirable feature. Also, with the arrangement of the intersecting gear seats and intermeshing gears, each additional gear added to the train produces another or additional pump. The construction described is also of comparatively small cost. In actual practice, the efficiency of the pump has been demonstrated. To produce a multiple gear pump, in accordance with my invention, requires three or more intermeshing gears and a corresponding number of intersecting gear seats.

What I claim is:

1. In a multiple feed gear pump, a body member having at least four intersecting gear seats and provided with admission ports leading to the inner section of the outer and corresponding adjacent inner seats, and with discharge ports leading from the opposite sides of the same seats, and provided further with an intermediate discharge port opening from the opposite point of intersection of the intermediate seats, in combination with intermeshing gears working in said seats, and a driving shaft connected to one of said gears for imparting motion to the entire train of gears, substantially as described.

2. In a multiple feed gear pump, a body member having at least four intersecting gear seats and provided with admission ports leading to the inner section of the outer and corresponding adjacent inner seats, and with discharge ports leading from the opposite sides of the same seats, and provided further with an intermediate discharge port opening from the opposite point of intersection of the intermediate seats, in combination with intermeshing gears working in said seats, and a driving shaft connected to one of said gears for imparting motion to the entire train of gears, and the said body member having a detachable plate which normally closes the said gear seats and closely engages the several gears, substantially as described.

In testimony whereof I affix my signature in presence of two witnesses.

WALTER A. FREDERICK.

Witnesses:
R. W. JUDSON,
G. W. YEOMAN.